United States Patent [19]

Mosher

[11] 3,878,652

[45] Apr. 22, 1975

[54] LOW COST PROGRAMMABLE REMOTE CONTROL MACHINE TOOL MANIPULATOR HAVING CONTINUOUS PATH CONTROL

[75] Inventor: Ralph S. Mosher, Elnora, N.Y.

[73] Assignee: Robotics, Incorporated, Elnora, N.Y.

[22] Filed: June 25, 1973

[21] Appl. No.: 373,125

[52] U.S. Cl.............. 51/165.89; 51/281 R; 118/8; 214/1 CM
[51] Int. Cl............................................ B24b 49/10
[58] Field of Search......... 214/1 CM; 118/7, 8, 321; 51/281, 165 TC, 165.71, 165.89

[56] References Cited
UNITED STATES PATENTS

| | | | |
|---|---|---|---|
| 2,445,167 | 7/1948 | Dahl | 51/165.89 X |
| 2,926,627 | 3/1960 | Demorest | 118/321 X |
| 3,665,652 | 5/1972 | Gordon | 51/165.71 |
| 3,785,898 | 1/1974 | Gerber | 118/8 |

*Primary Examiner*—Harold D. Whitehead
*Attorney, Agent, or Firm*—Charles W. Helzer

[57] ABSTRACT

A low cost, programmable, automatically operating remote control machine tool manipulator is provided having continuous path control about one, two or three axes of movement. The manipulator includes a work piece holding support, at least one working head and an electrically controlled power drive servo mechanism which may be electrohydraulic, electro pneumatic, electro mechanical or the like for physically moving the working head relative to the work piece holding support. The improvement comprises a low cost, continuous path, programmable, cam controlled input command position signal generating controller. This controller includes at least one movable continuous path position control cam for each axis of movement. The position control cams have control surfaces formed thereon which comprise a scaled down analogue representation of the transfer function that defines the desired command relative positioning of the working head and the work piece holding support. The control surfaces of the position control cams have a different physical configuration from the command relative positioning path shape which they represent and hence differ from pattern follower arrangements. A cam follower is provided to read out each position control cam and operates a mechanical-electrical transducer for converting the movement of the cam follower into electrical command position signals representative of the desired relative positioning of the working head with respect to the work piece holding support.

36 Claims, 11 Drawing Figures

LOW COST PROGRAMMABLE REMOTE CONTROL MACHINE TOOL MANIPULATOR HAVING CONTINUOUS PATH CONTROL

BACKGROUND OF THE INVENTION

1. Field of the Invention

This invention relates to programmable, automatically operable, remote control manipulators for use with machine tools and the like.

More particularly, the invention to a new and improved, relatively low cost programmable, remote control, automatically operable machine tool manipulator providing continuous path control over the positioning of the working head of a machine tool relative to a work piece holder. The manipulator is relatively simple and inexpensive to manufacture, set up, maintain and operate, readily can be reprogrammed and set-up to perform different functions, and is reliable in operation.

2. Prior Art of the Invention

Presently known programmable, automatically remote controlled manipulators for positioning a work member or tool in different positions relative to a work piece holding support may be categorized as falling into three broad classes.

The first class of manipulators is identified as providing "single point" or "on-off" control and usually involves the use of limit switches to control positioning from one point to another. Such machines are relatively simple and low cost but are capable of performing only simple straight line positioning movements as contrasted to more complex movements of a circular nature, for example.

The next broad class of remote control manipulators is identified as a "point to point" control and generally employs feed back servo mechanisms using appropriate sensors to perform positioning in complex patterns defined by a multiplicity of points. Of necessity, such point-to-point control involves the inclusin of a multiplicity of abrupt discontinuities occurring at each of the control points which, for practical considerations, can not be avoided even though a large number of control points are utilized.

The last class of remote control manipulators are identified as "continuous path" control manipulators wherein control of velocity, acceleration and positioning of the movement of the manipulator head continuously over its entire path, is provided. Heretofore, continuous path control has been achieved only with the use of complex and expensive magnetic tape, magnetic drum, punch tape or the like controllers requiring the use of, tape or drum readers and/or the use of complex and expensive analogue or digital computers.

SUMMARY OF THE INVENTION

It is a primary purpose of the present invention, to provide a new and improved, relatively low cost, programmable, automatically operable, remote control machine tool manipulator.

Another object of the invention is to provide such a machine tool manipulator that is capable of continuous path control over the positioning of the manipulator about one, two or three axes of movement in an effective and reliable manner.

Still another object of the invention is to provide such a programmable machine tool manipulator which may be readily set up and adjusted in the field while in use by relatively unskilled operators, and which readily may be initially programmed and then reprogrammed in a simple and comparatively inexpensive manner to perform different functions.

A still further object of the invention is to provide a programmable remote control machine tool manipulator of the above set forth type which includes two or more continuous path position controlling elements for one or more axis of movement together with a selector control for selectively rendering one of the controlling elements for controlling operation of the programmable remote control manipulator.

A further object of the invention is to provide a programmable machine tool manipulator having all of the above set forth characteristics, which is relatively simple and straightforward in design and construction, comparatively inexpensive to manufacture set up, program and reprogram, maintain and operate, and reliable in operation.

As stated above, complex curved motions readily can be executed by continuous-control machine tool manipulators. However, known continuous-control apparatus of the type mentioned above possess inherent limitations due to the fact that accuracy is limited if used with tape readers, drum readers or computer memory control records of reasonable proportions. Conversely, in order to achieve high orders of accuracy, control records of enormous capacity are needed and result in making such equipment prohibitively expensive for most manufacturing operations. To overcome this problem, one known prior art apparatus employed the use of both point-to-point and continuous-path control in a single equipment. However, the approach still is both complex and relatively expensive.

In practicing the present invention, a low cost, programmable, automatically operating, remote control machine tool manipulator having continuous path control is provided. The novel manipulator includes work piece holding means, working head means and electrically controlled power drive means for relatively physically moving the work piece holding means and the working head into desired work positions. Control over movement about one, two or three axes is provided as needed to meet the requirements for any particular machine. Position feedback servo means are provided for sensing the actual relative postioning of the work piece holding means and the working head and deriving feedback electrical signals representative of the instantaneous actual relative position. Novel programmable, automatic input command position signal producing means are provided, for automatically supplying electrical input command position signals representative of the desired relative positioning of the work piece holding means and the working head means. Servo amplifier means are provided for combining the input command position signal with the actual relative position feedback signal and deriving electrical output error control signals for controlling operation of the electrically controlled power drive means.

The novel programmable, automatic input command position signal generating means is comprised by a low cost, continuous path, programmable cam controlled input command position signal producing means including at least one movable, continuous path, position control cam for each axis of movement provided for the machine. The position control cams have control surfaces formed thereon which comprise a scaled down analogue representation of the transfer function that defines the desired command relative positioning path of the work piece holding means and the working head means for a given axis of movement.

The control surfaces of the position control cam have a different configuration from the command relative positioning path shape which they represent so that the apparatus differs from well known pattern follower arrangements. Cam follower means are coupled to read out the position control cam surfaces and mechanical - electrical transducer means are coupled to and controlled by the cam follower means for converting the movement of the cam follower means into electrical command position signals representative of the desired relative positioning path of the work piece holding means and the working head means.

In preferred arrangements, the working head is moved relative to the work piece holding means and multiple axes of movement are provided and where two dimensional, or three dimensional movement is provided, at least one position control cam having the above noted characteristics is provided for each axis of movement. Preferably the position control cams are rotary discs having the control cam surfaces formed on the periphery thereof, and are mounted on a common cam drive shaft with a mechanical phase displacement being interposed between the several rotary position control cams. Additionally, an auxiliary function rotary control cam is mounted on the same common cam drive shaft and includes at least one and preferably a plurality of control points radially spaced around the periphery of the auxiliary function control cam. The radially spaced control points are utilized to effect controlling operations such as grasping, releasing, ejecting, dispensing, start, stop and other integrated or auxiliary control functions required by a particular robot machine. In preferred embodiments of the invention, the spacing of the control points around the periphery of the auxiliary control may be readily adjusted in radial position by an operator of the machine who can determine the appropriate radial positioning of the control point relative to a particular operation being carried out by the machine, set the adjusted radial positioning of the control point for repeated operation in the field and thereafter leave the machine to perform its intended task. Additional operating and control features are also included particularly for those embodiments of the invention wherein two or more position control cams are provided for one or more axis of movement together with a suitable selector control for selectively rendering one of the position control cams effective for controlling operation of the programmable remote control manipulator.

BRIEF DESCRIPTION OF THE DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENT

Figures 1, 1A, 1B:
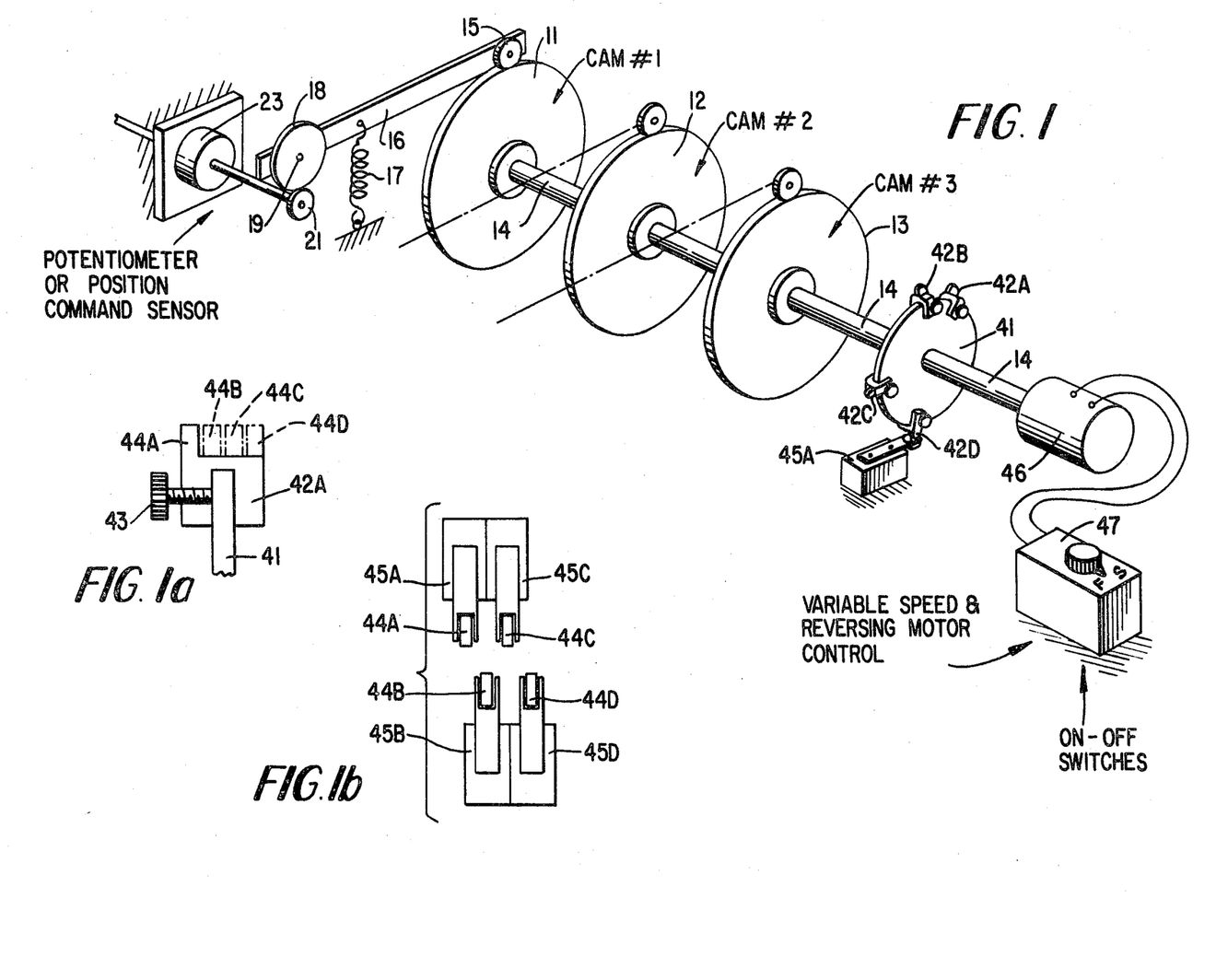
FIG. 1, is an overall perspective schematic view of a new and improved, low cost remote control machine tool manipulator constructed in accordance with the invention.
FIGS. 1A and 1B are details of the structure of FIG. 1.

FIG. 1 is a partial, schematic, perspective view of a new and improved programmable, low cost, continuous path, cam controlled input command position signal generator for use in three dimensional positioning of an automatically operable, remote control machine tool manipulator according to the invention. If desired, only one or two dimensional positioning can be provided by the same or a lower cost version of the command signal position generator by the inclusion of an appropriate number of position control cams as set forth in the following description. The continuous path, programmable, cam controlled input command position signal generator is comprised by a plurality of generally circular, disc-shaped rotatable cams shown at 11, 12 and 13 mounted on a common rotatable cam drive shaft 14. Each of the position control cams 11 – 13, has a peripheral control surface formed thereon which comprises a scaled down, analogue representation of the transfer function that defines the desired command relative positioning path of the working head of a machine tool manipulator relative to a work piece holding support. The peripheral control surfaces of the position control cams have a different physical configuration from the command relative positioning shape which they represent so that there is no identity in shape between the peripheral control surfaces of the position control cams and the shape of the path or trace being formed by the manipulator head in response to position control signals generated from the cam surfaces. The peripheral control surfaces are designed and formed on the rotary disc position control cams to provide desired output displacement, velocity, and/or acceleration at selected points in the path of travel of the working head in accordance with now well known cam design technology. As a matter of preference, the control cam peripheral surfaces may be cut into rotary disc blanks by two and-/or three dimensional milling and grinding numerical control contour machining techniques by appropriate programming to provide the desired control transfer function. The provision of suitable programming for this purpose is a now well known and commercially available art in the numerical control contour machining of control cams. Design of the position control cams may be in Cartesian or Cylindrical coordinates and should be such as to accommodate the particular characteristic motion kinematics of a given machine.

In the arrangement shown in FIG. 1, if it is assumed that control cam number 11 provides output position control for movement about one axis, for example the X axis, then cam 12 will provide control for movement about the Y axis and cam 13 would control movement about the Z axis, thereby providing control for movement of the manipulator in three dimensions. Mechanical phase displacement between the various position control cams 11 – 13 will, of course, be determined by the design parameters of the transfer function defining the desired path movement. Thus, for example, in a three dimensional control where it is necessary that the working head of the machine be moved in both the X and Y planes but remain fixed in the Z plane, appropriate mechanical phasing of the control cams must be provided to achieve this type of movement at the point in the path of movement of the machine so as to properly relate the control configurations designed into the control surfaces formed on the periphery of the respective control cams. To facilitate such alignment, the rotatable position control cams may be radially adjusted with respect to each other on the common cam drive shaft and then locked in place where appropriate mechanical phase relations have been achieved.

Cam follower means are provided for each of the position control cams 11 – 13 and are comprised by a cam trolley 15 rotatably secured to one end of a cam follower arm 16 having the end on which the cam trolley 15 is secured, biased into engagement with the peripheral control surfaces of its respective position control cam by means of a tension biasing spring 17. The end of cam follower arm 16 opposite from trolley 15 is secured to a gear wheel 18 with the gear wheel 18 and cam follower arm 16 being rotatable about a pivot point 19. The peripheral surface of the gear wheel 18 meshes with and drives a motion magnifying gear wheel 21 that in turn in connected to a common drive shaft 22 for driving the rotatable arm of a position command potentiometer 23. The position command potentiometer 23 may comprise any conventional, commercially available precision potentiometer such as those manufactured and sold by the Markite Division of the GCA Corporation. Other types of position sensors such as synchros, optical encoders, or the like also could be used.

Figure 2:
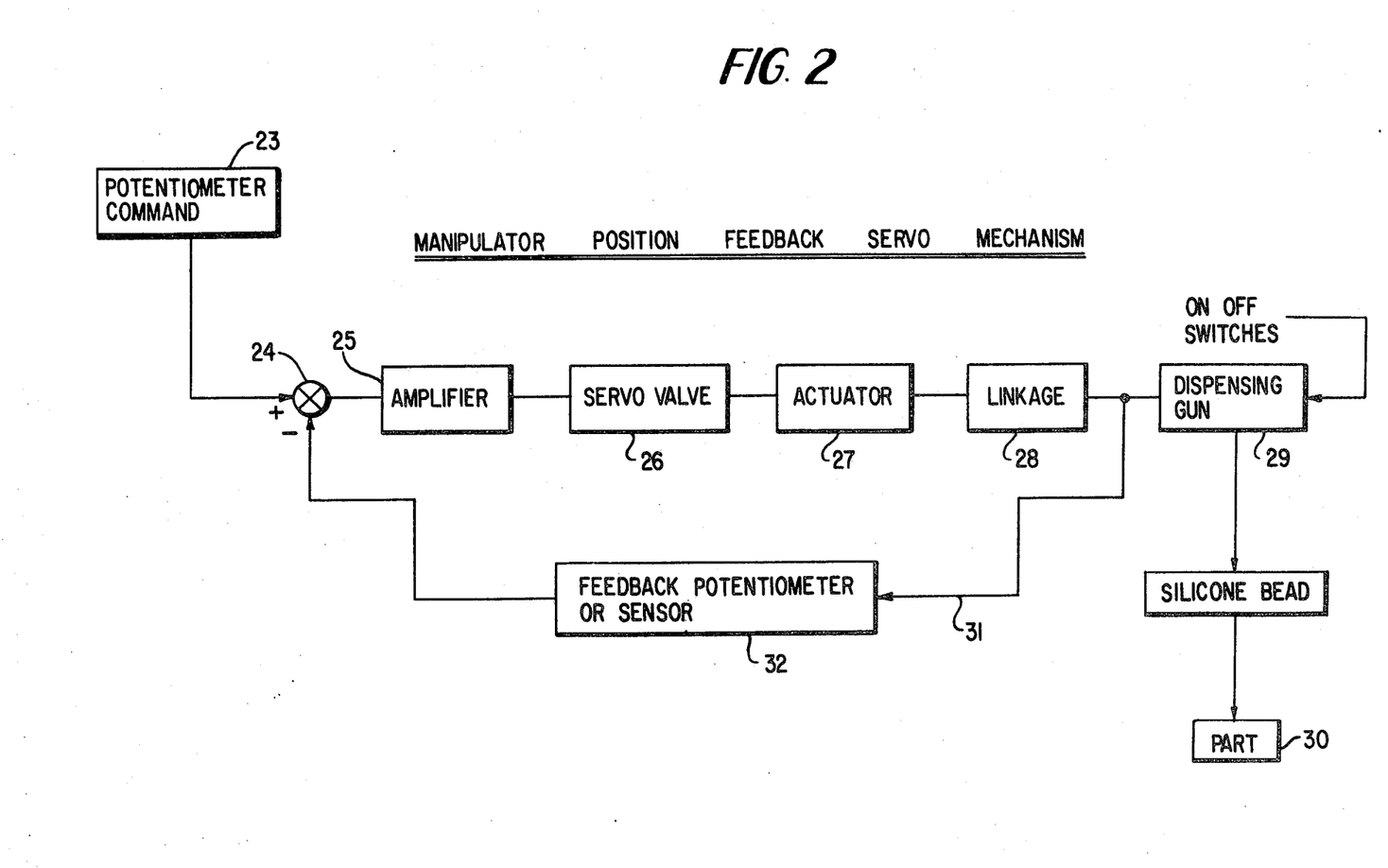
FIG. 2, is a functional block diagram of the electronic circuitry used to the control the operation of a working head mechanism for one axis of movement of the remote control manipulator shown in FIG. 1.

FIG. 2, is a functional block diagram of the manipulator position feedback servo mechanism employed for driving the manipulator working head about the axis of movement controlled by position control cam 11. The position command potentiometer 23 is shown at the left-hand side of FIG. 2 and supplies a variable voltage position command signal to an input electrical signal summing point shown at 24. The input summing point 24 may comprise the input circuit of a servo amplifier 25 whose output electrically controls the operation of a servo value 26 of a hydraulic actuator 27 that in turn controls the movement of a mechanical linkage 28. The servo amplifier 25 may comprise any conventional, commercially available servo amplifier such as those manufactured and sold by the Controls Division of Moog Manufacturing Company or the Dennison Manufacturing Company. The Moog DC servo controller Model No. 82-300 described in Data Sheet No. 823 published by the Controls Division of Moog Manufacturing Company comprises one suitable servo amplifier design for this function. The servo valve 26 and actuator 27 likewise may comprise a conventional, commercially available, electrically operated hydraulic servo valve and hydraulic actuator such as the type manufactured and sold by the Vickers Corporation, the Dennison Manufacturing Company of the Controls Division of the Moog Manufacturing Company and illustrated in Moog catalogue No. 760. The servo valve 26 and hydraulic actuator 27 serve to convert an input error control signal supplied to the servo valve 26 from servo amplifier 25 into a rotary, linear, or other desired physical motion that is coupled through linkage 28 to the working head of the manipulator. The servo valve 26, hydraulic actuator 27 and linkage 28 are sometimes referred to as the "motion kinematics" of the servo mechanism.

In the arrangement shown in FIG. 2, the working head of the manipulator comprises a conventional, commercially available dispensing gun for dispensing a plastic silicon bead in a desired pattern for formed-in-place gaskets for parts 30 of automotive engines such as oil pans, valve covers, intake manifolds, water pumps, transmission pans and the like. However, it is believed obvious to one skilled in the art that the working head may comprise any known machine tool or robot work performing device such as a grinder, cutter, drill, robot hand, etc. The motion imparted to the dispensing gun 29 also is mechanically coupled through a feedback linkage indicated at 31 to a feed back potentiometer or other suitable feed back sensor 32 that generates feedback electrical signals representative of the instantaneous actual position of the dispensing gun 29 measured with respect to the axis of motion in question. This actual position feedback signal is then supplied to the input summing point 24 of servo amplifier 25 where it is combined with the input position command signal derived from position command potentiometer 23 and provides at the output of servo amplifier 25 an electrical output error control signal for controlling the operation of the servo valve mechanism 26 in a well known manner. Similar manipulator position feedback servo mechanisms are provided for each of the remaining position control cams 12 and 13 in the case of two dimensional and three dimensional remote control manipulators, but have not been illustrated in FIG. 2 for the purpose of simiplicity. However, each of the position servo mechanisms for the Y and Z axis motions would be entirely similar in construction and operation to that disclosed above for the X axis as will be described hereinafter in connection with FIGS. 3 and 4 of the drawings.

In addition to the X, Y, and Z axis position control cams 11 – 13, an auxiliary function control cam comprised by a rotary disc 41 is mounted on the common cam drive shaft 14 and rotates in synchronism with the position control cam 11 – 13. The auxiliary function control cam disc 14 has a plurality of adjustable, cam operation control point adjusting means mounted radially around the periphery thereof as shown at 42A, 42B, 42C and 42D. These control point adjusting means are shown in greater detail in FIG. 1A of the drawings, wherein the rotary auxiliary function control cam disc is shown in partial section at 41. The control point adjusting means 42A – 42D comprise adjustable clamps which may be secured to the outer periphery of the auxiliary function control cam disc 41 by means of a threaded stop 43 or the like. The threaded stop 43 has a knurled knob that facilitates loosening and radial positioning of the stop to thereby adjust the control point around the periphery of auxiliary function control cam disc 41 where microswitches controlling auxiliary functions such as start, stop, in, out, dispense, stop dispensing, etc., will be actuated. Each of the control point adjusting means 42A – 42D has an engaging finger portion 44A – 44D each of whose axial positioning relative to the axis of rotation of the auxiliary function control cam 41 is offset relative to the axial positioning of the engaging finger portions of other control point adjusting means. The respective finger portions are positioned to engage and actuate respective ones of a plurality of electric microswitches, one of which is shown at 45A in FIG. 1, and all of which are axially displaced with respect to each other in the manner shown in FIG. 1B of the drawings. While in the presently dislcosed embodiment of the invention four auxiliary function control microswitches have been illustrated, it is believed obvious to one skilled in the art that any desired number of such auxiliary control function switches could be employed to fit the requirements of a particular application. To accommodate large numbers of auxiliary control functions, additional auxiliary control function rotary discs can be employed. Since they would all rotate at a synchronous speed with the position control cams, synchronization of the timing of the operation poses no great problem and is greatly facilitated. Further, other types of sensors such as optical encoders could be employed in place of the microswitch arrangement shown.

A more detailed description of the physical construction of the auxiliary function cam control point adjusting means and their related microswitches will be set forth hereinafter with relation to FIGS. 8 and 9 of the drawings. However, for the present, it is believed sufficient to point out that a relatively unskilled operator of the manipulator can, by visually observing and tracking the positioning of the manipulator working head, determine the precise points in the path of travel of the working head at which the control point adjusting means 42A – 42D are rendered effective to close and-/or open their related microswitches 45A – 45D. Thus, in the arrangement depicted in FIGS. 1 and 2, the precise points at which the dispensing gun 29 is caused to move in or away from a work piece and to commense dispensing and thereafter stop dispensing a silicon bead, can be determined empirically by an operator of the equipment. In initially setting up and aligning the machine for operation, the operator therefore sets the auxiliary function cam control point adjusting means 42A – 42D at appropriate points on the periphery of the auxiliary function control cam 41 while observing the movement of the working head. Needless to say, the auxiliary function control cam 41 itself can comprise nothing more than a circular disc blank and does not have a precise position controlling surface configuration machined into its periphery since its control points are determined by the setting of the control point adjusting means 42A – 42D.

To facilitate initial set up and alignment of the remote control manipulator, as well as its operation, the common cam drive shaft 14 is coupled to and driven by a reversivle, variable speed gear motor 46, which is electrically controlled by a variable speed reversing motor controller 47. The reversible, variable speed gear motor 46 and motor controller 47 may be conventional, commercially available components such as those manufactured and sold by the Bodine Manufacturing Company of Chicago, Illinois. By reason of the provision of the reversing and variable speed characteristic, precise control of the initial alignment and set up of the control points of the periphery of the auxiliary function control cam disc 41 as well as precise control over the read out speed of the position control cams 11 – 13, is provided along with the precise control of the velocity of movement over the control path being traced out by the manipulator head dispensing gun 29.

In operation, each of the position control cams 11 – 13 are initially machined in accordance with known control cam machining and forming technology either by numerically controlled machine tools or otherwise to provide the precise position control surface configuration to the periphery of the position control cam for the respective axis of movement which it controls. The finished position control cams are then mounted on the common cam drive shaft 14 by suitable set screws or the like and roughly rotationally adjusted to provide the appropriate phase displacement as discussed above between the several position control cams. Similarily, the auxiliary function control cam control point adjusting means 42A 42D are roughly set to the peripheral positions on the control cam where it is desired that they take effect and actuate their associated microswitches.

Following the initial alignment procedures discussed above, gear motor 46 is caused to rotate the position control cams and the operator of the equipment visually observes the effective path being traced out by the dispensing gun working head 29. During this initial movement, the respective control cams 11 – 13 are appropriately adjusted phase wise with respect to their rotational positioning relative to each other to provide the desired tracing path for the working head dispensing gun with respect to a particular work part 30 on which a silicon gasket bead is being deposited. After this initial alignment procedure is completed and the desired preprogrammed command path is being traced out by the working head dispensing gun, the position control cams are firmly set in place in the auxiliary function control cam 41 finally adjusted to cause the auxiliary control functions such as movement of the head toward or away from the work piece, start dispensing of silicon bead, stop dispensing, etc., by appropriate final adjustment of the peripheral positioning of the auxiliary function control point adjusting means 42A – 42D. Following this alignment procedure, the manipulator then is ready for repeated operations at desired speeds determined by the setting of the variable speed reversing motor controller 47 and compatible with the operation of the working head dispensing gun 29 and effective formation of a suitable formed-in-place silicon bead gasket on the part 30.

Figure 3:
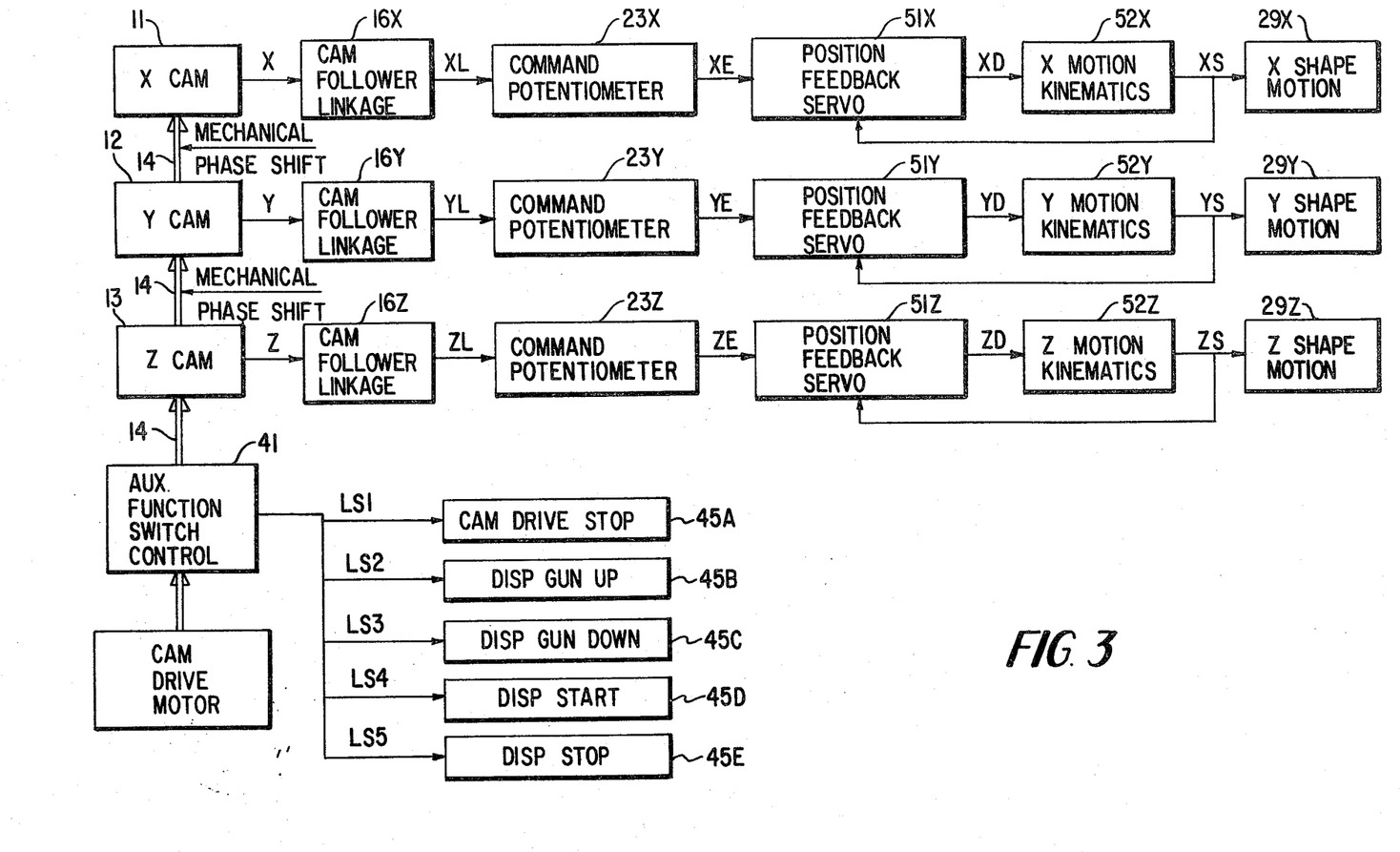
FIG. 3, is a functional block diagram illustrating the overall electronic circuitry of a new and improved remote control manipulator constructed in accordance with the invention for providing three dimensional movement of the working head of a machine.

FIG. 3 of the drawings in a schematic block diagram of a three dimensional, programmable, automatic, remote control manipulator constructed in accordance with the invention, and illustrates all three X, Y, and Z servo mechanism channels. As illustrated in FIG. 3, motion about the X axis is controlled by the X axis position control cam 11 through cam follower linkage 16X and command potentiometer 23X. The output from command potentiometer 23X is an electrical command signal that is supplied to the summing input of a position feedback servo 51X which sums the command position input electrical signal with an actual position feedback electrical signal derived through feedback linkage indicated at 31X. The position feedback servo 51X sums the command and feedback position signals and derives an output error control signal that then controls the operation of the X motion kinematics 52X for driving the working head 29 through a desired series of motions relative to the X axis. Similarly, the Y axis position control cam 12 and the Z axis position control cam 13 operate through their related cam follower linkage 16Y, 16Z command potentiometer 23Y, 23Z position feedback servos 51Y, 51Z and Y and Z motion kinematics to control the respective Y and Z axis motion of the working head 29. Simultaneously the auxiliary function control cam 41 controls operation of the respective auxiliary function microswitches 45A – 45E to control in or out motions of the work head, start, stop, dispense, stop dispense, or other desired functions of the working head. Should a manipulator providing a complex wrist type rotary grasping action be employed with the invention, then additional control channels similar to those illustrated in FIG. 3 may be required in order to provide the necessary positioning controls about additional axes of movement. However, in view of the foregoing disclosure the provision of such additional control motion utilizing the invention, is believed to be obvious to one skilled in the art.

Figure 4:
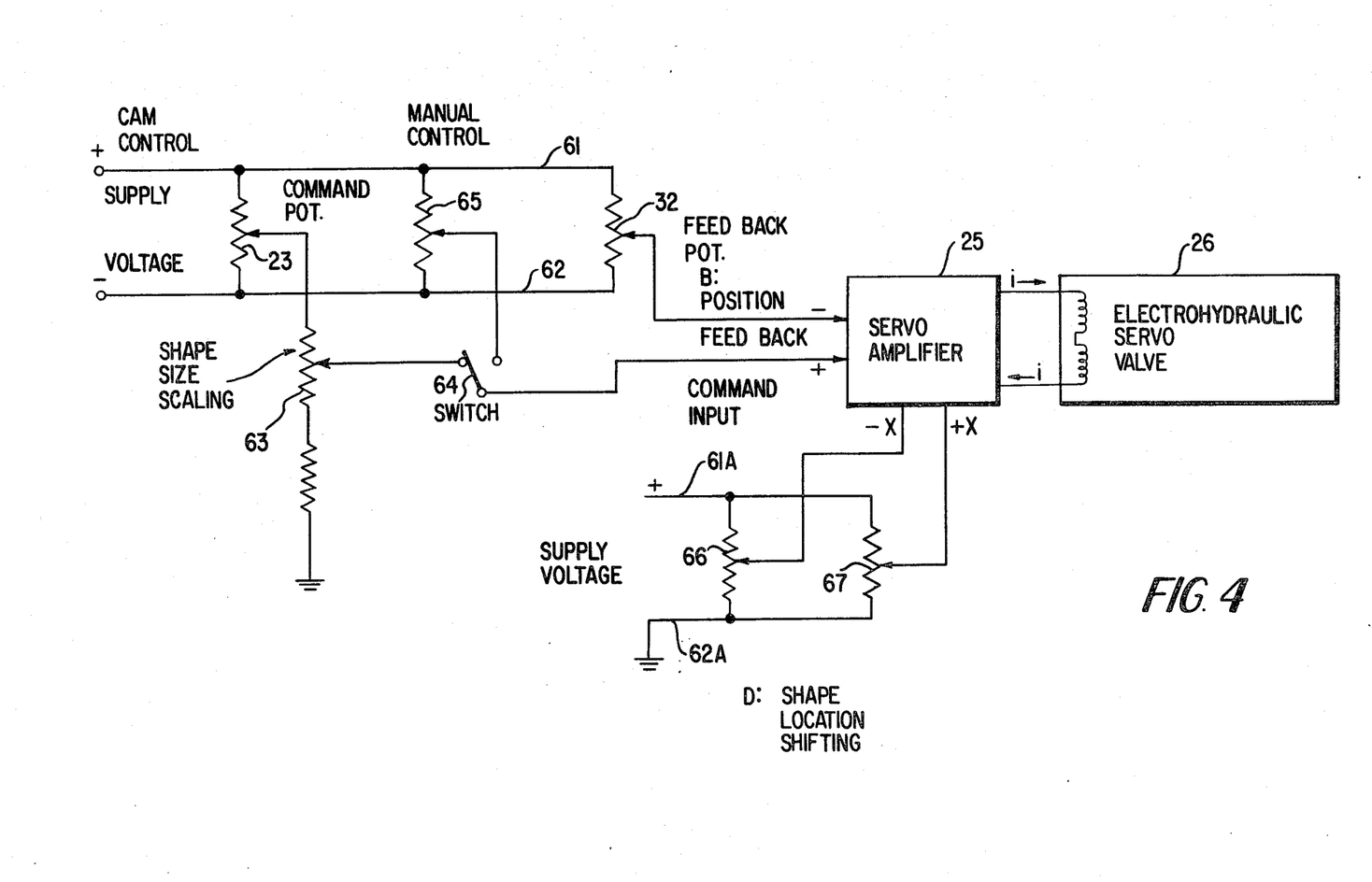
FIG. 4, is a schematic circuit diagram showing certain details of the circuits of FIGS. 2 and 3 whereby shape size scaling and shape location shifting can be accomplished.

FIG. 4 of the drawings in a more detailed schematic circuit diagram of the construction of each of the position feedback servo amplifiers 51X – 51Z shown in block diagram form of FIG. 3 for each axis of motion control. In FIG. 4, a regulated direct current source os supply voltage, (not shown) of the order of ± 10 – 24 volts DC is connected across a first set of power supply terminals 61 and 62 and a second set of corresonding terminals 61A and 62A. The position command potentiometer 23 is shown schematically as a variable resistor in FIG. 4, with movement of the variable contact point being controlled motion wise by the cam follower arrangement of the particular position control cam with which it is associated as discussed above. The variable contact point of the position command potentiometer 23 is connected through a variable resistor 63 that comprises a second potentiometer used for path, shape, size, scaling. The movable contact point of the path, shape, size, scaling potentiometer 63 is connected to one fixed contact point of a selector switch 64 whose movable contact is connected to the command input terminal of the of the servo amplifier 25.

Servo amplifier 25 may comprise any conventional feedback stablized operational amplifier such as those listed previously with respect to FIG. 2 of the drawings, and has its command input selectively switched between command potentiometer 23 and a manual control potentiometer 65 by switch 64. For this purpose the remaining fixed contact point of selector switch 64 is connected to the movable contact of manual control potentiometer 65 that is connected across the direct current power supply terminals 61 and 62 in parallel circuit relationship with the automatic, remote control position command potentiometer 23. The actual position feedback potentiometer is comprised by a variable resistor 32 connected across the direct current power supply terminals 61 and 62 in parallel circuit relationship with the potentiometer resistors 23 and 65. The movable contact point of position feedback potentiometer 32 (whose feedback linkage is not shown) is connected to a second negative-input terminal of the servo amplifier 25 for summing with the command input supplied to the positive (+) input terminal. As a consequence of this arrangement, the command position input signal whether supplied automatically by the command position potentiometer 23 or manually by the manual control potentiometer 65 (through appropriate setting of the selector switch 64) will be summed at the input of the servo amplifier 25 with the actual position feedback signal derived from the position feedback potentiometer 32.

By appropriate setting of the shape size scaling potentiometer 63, the magnitude of the movement imparted by the electro hydraulic servo valve 26 to the manipulator working head linkage, as a consequence of a given value position command input signal, can be controlled. By appropriate setting of the shape size scaling potentiometer 63, a given control surface configuration on one of the position control cams will give rise selectively either to a larger or smaller magnitude command input signal valve thus causing the feedback potentiometer to be moved either a greater or smaller distance by the servo mechanism in order to return the servo amplifier to a balanced condition. This results either in scaling up or down the magnitude of the motion of the working head, and hence the path shape size.

In addition to the path shape size scaling feature described above, path (shape) location shifting means are provided by a pair of potentiometers 66 and 67 which are connected across the direct current power supply terminals 61A and 62A. The movable contact point of the potentiometer 66 provides a (−X) compensating voltage to a supply input terminal of the servo amplifier 25 and the potentiometer 67 provides a (+X) compensation voltage to a second supply input terminal of servo amplifier. By appropriate adjustment of the (−X) and (+X) compensation input potentials to the servo amplifier 25, the zero position location (initial starting position) of the working head of the manipulator is appropriately adjusted with respect to the X axis. Corresponding path location shifting compensation potentials are provided for both the Y and Z axis channels of the positioning servo mechanism for appropriately adjusting the zero or initial positioning of the working head with respect to the Y and Z axis. Thus, it will be appreciated that by appropriate adjustment of the potentiometers 66 and 67 the initial starting position (and hence ultimate location) of the path shape defined by the movement of the working head in response to input position command signals can be shifted; and by appropriate setting of the path shape size scaling potentiometer 63 the magnitude or size of the path defined by the movement of the working head can be adjusted or scaled to be either larger or smaller to meet the requirements of a particular job.

Figure 5:
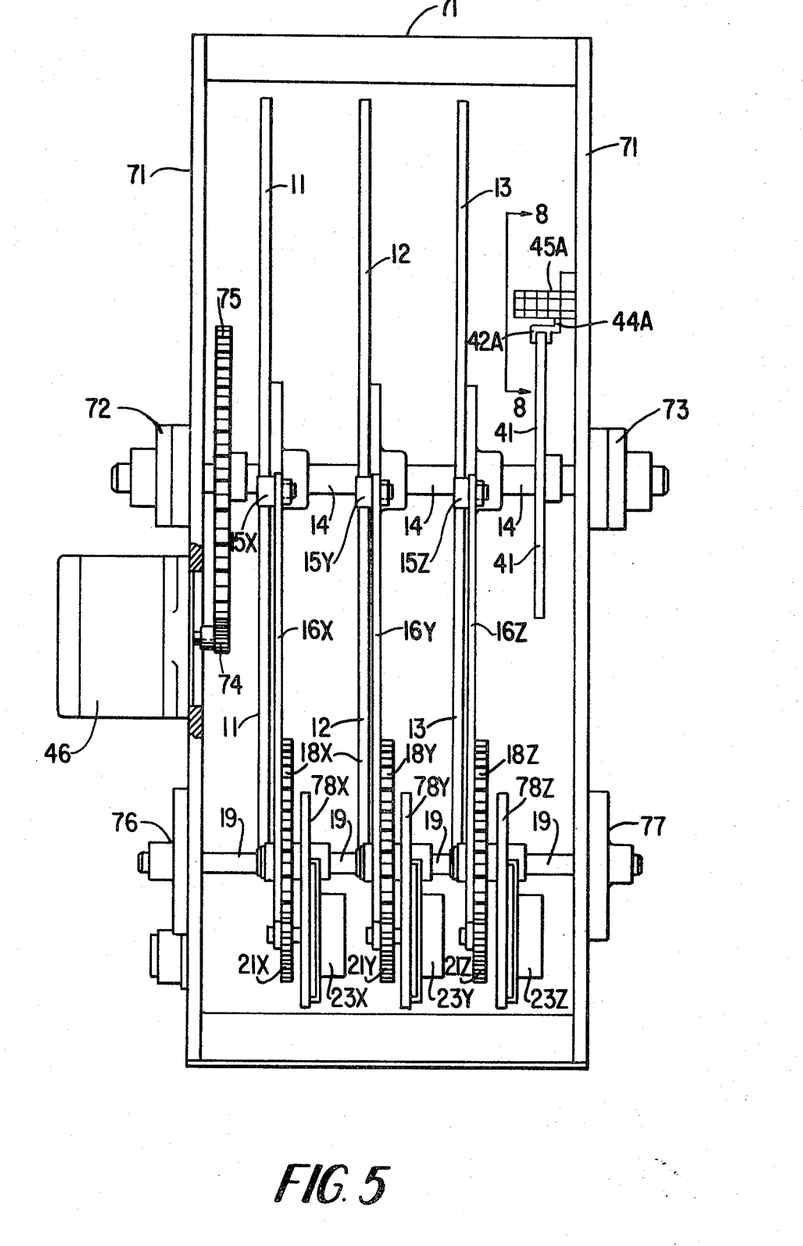
FIG. 5, is a cross sectional view of a control cam housing illustrating the common housing arrangement and certain constructional details of the control cams employed in the remote control manipulator illustrated schematically in FIGS. 1 and 3.

FIG. 5 is a section view of suitable cam controlled position signal generator constructed according to the invention and comprises a cam control housing 71 having bushings 72 and 73 mounted on opposite sides for rotatably supporting the common cam drive shaft 14. The three position control cams 11, 12 and 13 for the X-Y-Z axis motions, respectively, are shown mounted on the cam drive shaft 14, and are rotated by variable speed reversing gear motor 46 acting through a spur gear 74 that drives a speed reducing gear 75 keyed to cam drive shaft 14. The position control cam readout trolley rollers 15X, 15Y and 15Z are shown mounted on the ends of the cam follower arms 16X, 16Y, and 16Z, respectfully, which in turn are secured to motion translating gear wheels 18X, 18Y, and 18Z that mesh respectively with the motion magnifying transducing gears 21X, 21Y, and 21Z. The gears 21X, 21Y and 21Z in turn drive their respective position command signal generating potentiometers 23X, 23Y and 23Z through separate drive shafts for each axis of motion. A fixed shaft 19 is secured between opposite sides of housing 71 by suitable mounts 76 and 77 and serves to rotatably support the motion transducing gears 18X, 18Y and 18Z that are secured to and rotate with the ends of the cam follower arms 16X, 16Y and 16Z. The auxiliary function control cam disc 41 is secured to and rotates with the main cam drive shaft 14. A plurality of control point adjusting means 42A, etc are arrayed on the outer periphery of the auxiliary function control cam disc 41. The control point adjusting means 42A, etc. have their switching engaging contact arms 44A, etc., respectfully aligned to engage respective ones of the auxiliary function control microswitches 45A, etc. as described above with respect to FIG. 1 of the drawings.

Figure 6:
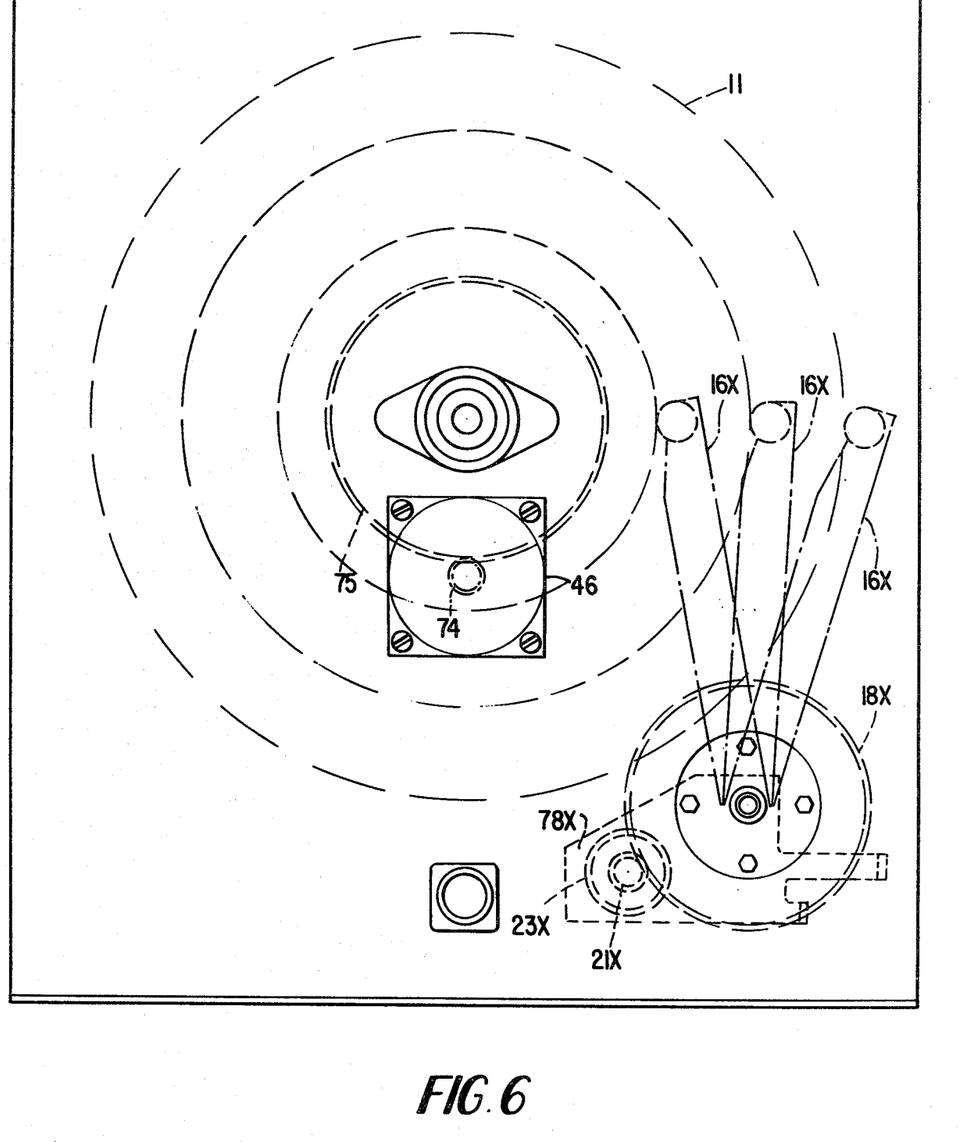
FIG. 6, is a schematic side view of one of the control cams and its associated cam follower disposed within the cam housing shown in FIG. 6 as viewed from plane 6—6 in FIG. 5.

FIG. 6 is an end view of the cam control shown in FIG. 5 taken through plane 6—6 and looking in the direction of the arrows. From FIG. 6 it will be noted that the peripheral control surfaces of the position control cam 11 are indicated only in phantom in order to depict the manner in which the following arm 16X is allowed to assume various angular positions with respect to its pivotal axis, and in order to translate the changing contour of the peripheral control surfaces into magnified motion imparted to the command position potentiometer 23X through the motion magnifying gearing 21X. As depicted more clearly in FIG. 6, the command position potentiometer 23X and its movement magnifying drive gear 21X are supported on a suitable mounting plate 78 secured within the housing 71 for fixedly supporting the respective command position signal generating potentiometers and its relative drive gears.

Figure 7:
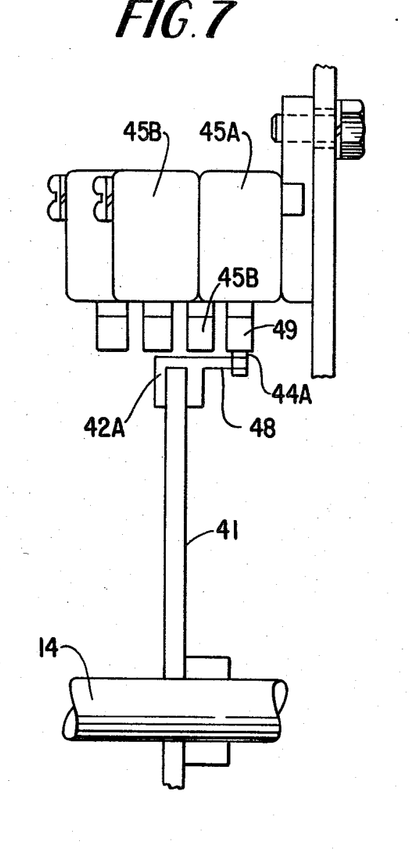
FIG. 7, is a partial schematic, enlarged section view of the auxiliary function control cam construction shown in FIG. 5 at 8—8 and illustrates the manner in which the radial positioning of the auxiliary function control points can be adjusted.

FIG. 7 of the drawings is an enlarged fragemntary view taken along plane 8—8 of FIG. 1, and illustrates a portion of the auxiliary function control cam 41 in greater detail. The construction of the radially adjustable, control contact point adjusting means is shown as comprising disc clamps which are secured in place around the outer periphery of the auxiliary function control cam disc 41 by suitable set secrws. Small extension rods 81 are secured to each disc clamp for supporting a sliding collar that comprises the projecting arm 44A, etc. By appropriate mounting of the disc clamps 42A, etc., and adjustment of the sliding collar 44A, etc. along the length of the extension rods 48, the projections 44A, etc. can be made to contact a respective movable contact arm 49 of a selected auxiliary function control microswitch 45A, etc.

Figure 8:
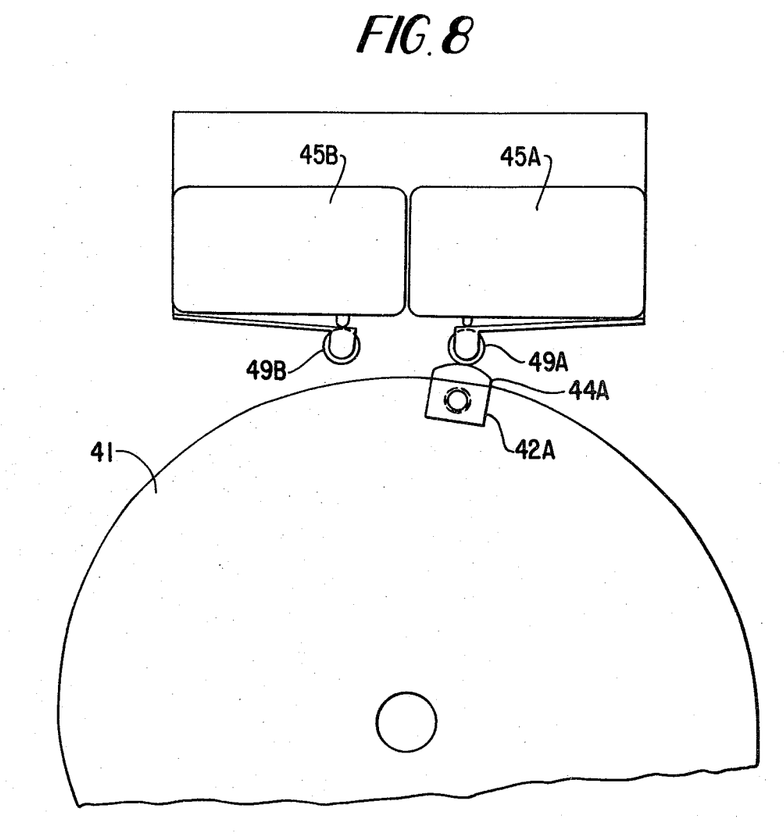
FIG. 8, is a schematic, partial side view of the auxiliary function control cam arrangement as viewed from plane 8—8 in FIG. 5 and further illustrates its construction.

FIG. 8 of the drawings is a partial side view of the assembly and illustrates how the projection formed by the sliding collar 44A on the respective disc clamps 42A can be made to engage the movable contact arm 49A of a respective microswitch 45A thereby causing the microswitch to close (or open) depending upon the control function desired. Since the projection 44A will not be axially aligned under the movable contact arm 49B of the next adjacent auxiliary function control microswitch 45B, microswitch 45B will not be actuated by passage of the projection 44A into radial alignment with 49B as will be appreciated by inspection of FIG. 7 of the drawings.

Figure 9:
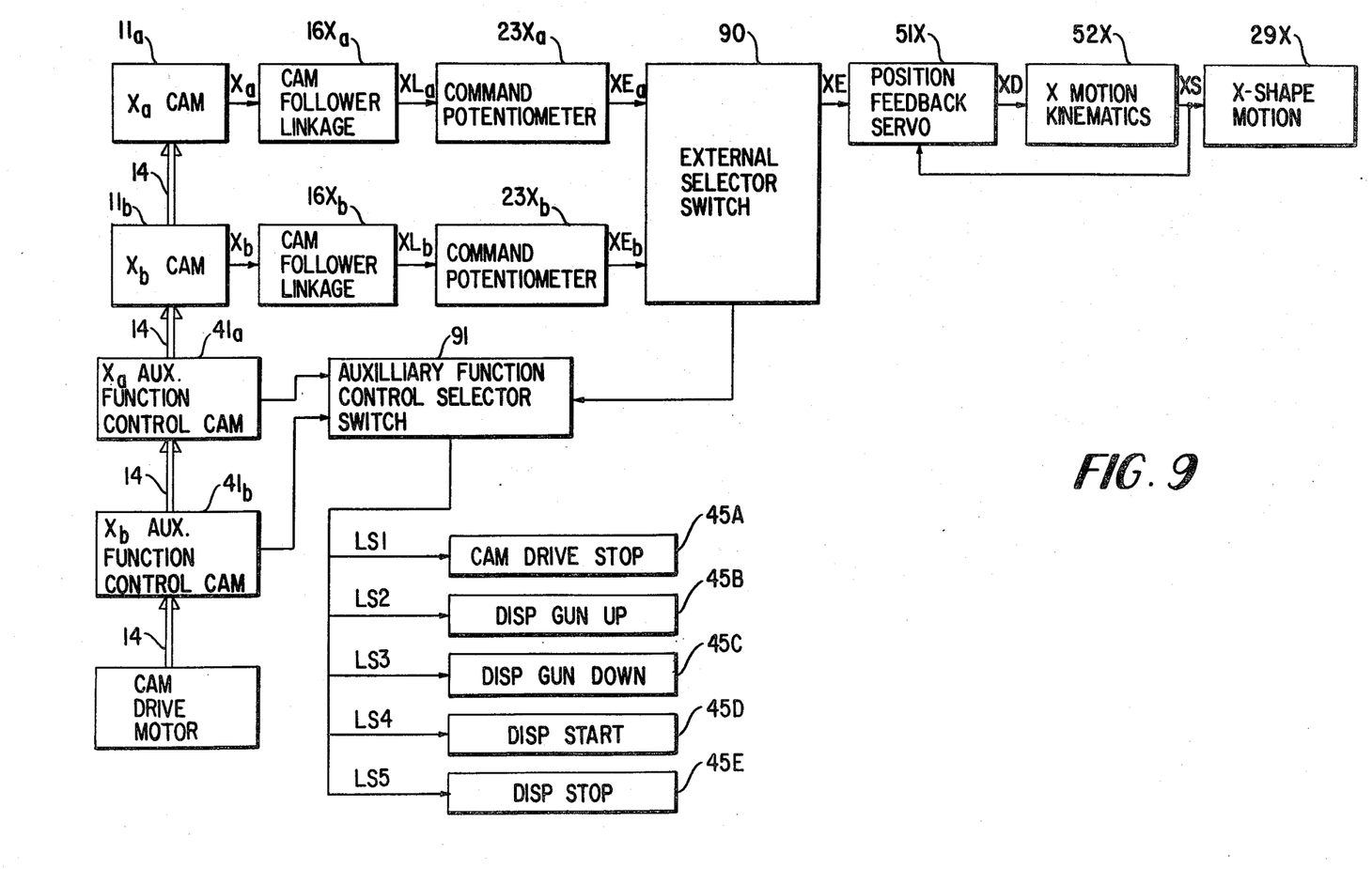
FIG. 9, is a functional block diagram of a modified form of the invention whereby the remote control manipulator can be adapted for use with different work pieces traveling along the same production line selectively and readily.

FIG. 9 is a schematic, functional block diagram of one channel (axis of movement) of an embodiment of the invention which provides for the selection of different paths of movement for at least one axis of movement of the manipulator. If desired, one or more, additional, different position control cams, similar to those illustrated in FIG. 9 for the X axis, could be provided for each axis of movement provided for the manipulator in a manner similar to that illustrated in FIG. 9. By thus adapting the remote control maniuplator according to the invention, a single manipulator can be used for work on or with different parts coming down a single production or assembly line, for example. The manner in which this is accomplished, will be better appreciated from the following discussion.

In the embodiment of the invention illustrated in FIG. 9, there are at least two different, continuous path, rotary position control cams 11a and 11b secured to the common rotatable cam drive shaft 14 for generating different X-axis command position control signals in conjunction with their respective, associated cam follower linkages 16Xa, 16Xb and command potentiomenters 23Xa and 23Xb, respectively. The output from the respective, different X-axis command potentiometers 23Xa and 23Xb are supplied as one of the inputs to an external position control selector switch 90. The selector switch 90 may comprise any form of externally controlled switching arrangement for selectively connecting one or the other of the command potentiometer 23Xa or 23Xb to the input of the position feedback servo 51X. For this purpose, a manual control switch could be employed; however, preferably a remote operated selector switch under the control of a production line supervisor, control console, computer, or the like, is employed, and may be relay actuated, or comprise an OR-gate logic network or similar device under the control of an externally developed electric control signal. The position control selector swith 90 selectively connects one or the other of the output signals from the command potentiometer 23Xa, 23Xb as the command position controlling input signal to the position feedback servo 51X. In other respects, the system of FIG. 9 operates in a manner similar to the system described with respect to FIGS. 2 and 3 of the drawings.

In addition to the different position control cams 11a and 11b for the X-axis, the arrangement of FIG. 9 also includes different, additional X-axis auxiliary function control cams 41a and 41b corresponding to the Xa position control cam and the Xb position control cam, respectively. The respective associated auxiliary function control cams 41a and 41b and their related readout microswitches (not shown) have the output thereof selectively connected to control the auxiliary function through an auxiliary function control selector switch 91 which in turn is under the control of the external position control selector switch 90. By this arrangement, upon the external position control selector switch 90 being operated to connect the output of command potentiometer 23Xa from the X-axis position control cam 11a to supply the command position input signal to position feedback servo amplifier 51X, simultaneously switch 91 will cause the output of auxiliary function control cam 41a to control the various auxiliary functions shown at 45A through 45E. Conversely, where the external position control selector switch 90 connects the position controlling output signal from the Xb cam 11b to the input of servo amplifier 51X, auxiliary function control selector switch 91 operates to connect the Xb auxiliary function control cam 41b and its associated microswitches into controlling circuit relationship with respect to the auxiliary function devices 45A–45B. It is believed obvious to one skilled in the art from this description, that the Y-axis and the Z-axis movements, as well as any additional axes of movement, could be similarly modified to provide for different types of movements from a single manipulator constructed in accordance with FIG. 9.

From the foregoing description, it will be appreciated that the invention makes available a new and improved low cost, programmable, automatically operating remote control machine tool manipulator having continuous path control. Having described one embodiment of such a remote control machine tool manipulator constructed in accordance with the invention, it is believed obvious that other modifications and variations of the invention will be suggested to those skilled in the art in the light of the above teachings. It is, therefore, to be understood that changes may be made in the particular embodiment of the invention described which are within the full intended scope of the invention as defined by the appended claims.

I claim:

1. In a programmable automatically operable remote control machine tool manipulator having continuous path control including working head means, electrically controlled power drive means for relatively physically moving the working head means into desired relative work positions, with respect to a work piece, position feedback servo means for sensing the actual relative positioning of working head means and deriving feedback electricl signals representative thereof, programmable automatic input command position signal producing means for automatically supplying an electrical input command position signal representative of the desired relative positioning of the working head means, and circuit means for combining the input command position signal with the actual relative position feedback signal and deriving electrical output error control signals for controlling operation of said electrically controlled power drive means, the improvement comprising an improved low cost, continuous path programmable cam controlled automatically operable input command position signal producing means including at least one movable continuous path position control cam having control surfaces formed thereon which comprise a scaled down analogue representation of the transfer function that defines the desired command relative positioning of the the working head means, the control surfaces of said position control cam having a different physical configuration from the command relative positioning path which they represent, cam follower means coupled to the position control cam for reading out the command relative positioning representations, and transducer means coupled to and controlled by the cam follower means for converting the movement of the cam follower means into electrical command position signals representative of the desired relative positioning of the working head means.

2. A programmable remote control machine tool manipulator according to claim 1, further including auxiliary function control signal producing means synchronously operable with said movable continuous path position control cam for deriving auxiliary function control signals usable at particular points in the relative positioning of the working head means for initiating and controlling various operations performed on a work piece by the working head means.

3. A programmable remote control machine tool manipulator according to claim 2, further including means for adjusting the auxiliary function control signal producing means relative to the movable continuous path position control cam to thereby allow an operator of the equipment to adjust the location of the points in the relative positioning path of the manipulator working head at which auxiliary function control signals will be produced.

4. A programmable remote control machine tool manipulator according to claim 1 wherein a plurality of movable continuous path position control cams together with associated cam follower means and transducer means are provided for at least one axis of movement of the manipulator and further including selector switch means operatively coupled to the circuit means for combining the input command position signal with the actual relative position feedback signal and further connected to the transducer means for each one of the plurality of position control cams for a given axis of movement for selectively switching the output from a desired one of the position control cams into controlling circuit relationship with the circuit combining means.

5. A programmable remote control machine tool manipulator according to claim 3 wherein a plurality of movable continuous path position control cams together with associated cam follower means and transducer means are provided for at least one axis of movement of the manipulator together with a respective associated auxiliary function control signal producing means for each position control cam provided for a given axis of movement, and further including position control selector switch means operatively coupled to the circuit means for combining the input command position signal with the actual relative position feedback signal and further connected to the transducer means for each one of the plurality of position control cams for a given axis of movement for selectively switching the output from a desired one of the position control cams into controlling circuit relationship with the circuit combining means, and auxiliary function control selector switch means operable in conjunction with said position control selector switch means for selectively switching a desired one of the auxiliary function control signal producing means into operative controlling relationship with the working head of the manipulator.

6. A programmable remote control machine tool manipulator according to claim 1, wherein the movable continuous path position control cam comprises a generally circular disc-shape control cam having a peripheral control surface, the generally circular disc-shape control cam being rotatable to provide continuous path position control with the cam follower means engaging and riding upon the peripheral control surface.

7. A programmable remote control machine tool manipulator according to claim 6, further including a generally circular rotatable auxiliary function control disc synchronously rotatable with said generally circular rotatable disc-shape continuous path position control cam for deriving auxiliary function control signals usable at particular points in the relative positioning of the working head means and the workpiece holding means for initiating and controlling operations performed on the workpiece.

8. A programmable remote control machine tool manipulator according to claim 7, wherein the rotary auxiliary function control disc includes means for adjusting the radial location on the periphery of the rotary auxiliary functin control disc at which point auxiliary function control signals will be generated by the auxiliary function control disc.

9. A programmble remote control machine tool manipulator according to claim 8 wherein a plurality of rotary continuous path position control cams together with associated cam follower means and transducer means are provided for at least one axis of movement of the manipulator and further including position control selector switch means operatively coupled to the circuit means for combining the input command position signal with the actual relative position feedback signal and further connected to the transducer means for each one of the plurality of rotary position control cams for a given axis of movement for selectively switching the output from a desired one of the position control cams into controlling circuit relationship with the circuit combining means.

10. A programmable remote control machine tool manipulator according to claim 8, further including a common rotatable cam drive shaft for supporting and rotating said rotatable continuous path position control cam and said rotatable auxiliary control function disc, cam drive motor means for rotating said common cam drive shaft, and auxiliary control function signal generator means coupled to and engageable by said rotary auxiliary control function disc for generating auxiliary function control signals utilized in the operation of the remote control machine tool manipulator at particular points along the relative positioning path of the working head and the work piece holding means.

11. A programmable remote control machine tool manipulator according to claim 10, wherein the rotary auxiliary function control disc includes means for adjusting the radial location on the periphery of the rotary auxiliary function control disc at which point auxiliary function control signals will be generated by the auxiliary function control disc.

12. A programmable remote control machine tool manipulator according to claim 11, wherein the manipulator is capable of movement about multiple axes and at least one movable continuous path position control cam is provided for each axis of movement together with its related cam follower means and transducer means.

13. A programmable remote control machine tool manipulator according to claim 12, wherein the cam drive motor means comprises a reversible variable speed cam drive motor controlled by a reversible variable speed drive motor controller.

14. A programmable remote control machine tool manipulator according to claim 13, wherein the working head means is moved relative to a work piece, and wherein the programmable automatic input command position signal producing means further includes means for scaling the size of the positioning path shape defined by the positioning of the working head in response to the input command position signals and the position feedback servo means further includes means for shifting the location of the positioning path shape defined by the positioning of the working head.

15. A programmable remote control machine tool manipulator according to claim 1, further including automatic-manual selector switch means and manual position control signal generating means, said automatic-manual selector switch means selectively serving to connect either said programmable automatic input command position signal producing means or alternatively said manual position control signal generating means to the input of the position feedback servo means for selectively controlling positioning of the remote control machine tool manipulator either automatically or manually.

16. A programmable remote control machine tool manipulator according to claim 15 wherein a plurality of rotary continuous path position control cams together with associated cam follower means and transducer means are provided for at least one axis of movement of the manipulator together with a respective associated auxiliary function control signal producing means for each position control cam provided for a given axis of movement, and further including position control selector switch means operatively coupled to the circuit means for combining the input command position signal with the actual relative position feedback signal and further connected to the transducer means for each one of the pluraltiy of rotary position control cams for a given axis of movement for selectively switching the output from a desired one of the position control cams into controlling circuit relationship with the circuit combining means, and auxiliary function control selector switch means operable in conjunction with said position control selector switch means for selectively switching a desired one of the auxiliary function control signal producing means into operative controlling relationship with the working head of the manipulator.

17. A programmable remote control machine tool manipulator according to claim 3, wherein the programmable automatic input command position signal producing means further includes command positioning path shape size scaling means for selectively increasing or decreasing the size of the shape of the positioning path defined by relative positioning of the working head means in response to the input command position signal.

18. A programmable remote control machine tool manipulator according to claim 3, wherein the position feedback servo means further includes positioning path location shifting means for selectively shifting the location of the positioning path defined by the relative positioning of the working head means.

19. A programmable remote control machine tool manipulator according to claim 3, wherein the programmable automatic input command position signal producing means further includes command positioning path shape size scaling means for selectively increasing or decreasing the size of the shape of the positioning path defined by relative positioning of the working head means in response to the input command position signal, and the position feedback servo means further includes positioning path location shifting means for selectively shifting the location of the positioning path defined by the relative positioning of the working head means.

20. A programmable remote control machine tool manipulator according to claim 19, and further including selector switch means and manual position control signal generating means, said selector switch means selectively serving to connect either said programmable automatic input command position signal producing means or alternatively said manual position control signal generating means to the input of the position feedback servo means for selectively controlling positioning of the remote control machine tool manipulator either automatically or manually.

21. A programmable remote control machine tool manipulator according to claim 8, further including selector switch means and manual position control signal generating means, said selector switch means selectively serving to connect either said programmable automatic input command position signal producing means or alternatively said manual position control signal generating means to the input of the position feedback servo means for selectively controlling positioning of the remote control machine tool manipulator either automatically or manually.

22. An improved programmable continuous path cam controlled automatically operable input command position signal generator including at least one movable continuous path position control cam having control surfaces formed thereon which comprise a scaled down analogue representation of the transfer function that defines the desired command relative positioning of the working head means of an automatic remote control machine tool manipulator, the control surfaces of said position control cam having a different physical configuration from the command relative positioning path which they represent, cam follower means coupled to the position control cam for reading out the command relative positioning reepresentations, transducer means coupled to and controlled by the cam follower means for converting the movement of the cam follower means into electrical command position signals representative of the desired relative positioning of the working head means and auxiliary function control signal producing means synchronously operable with said movable continuous path position control cam for deriving auxiliary function control signals usable at particular points in the relative positioning of the working head means of an automatic remote control machine tool manipulator for initiating and controlling various operations performed on a work piece by the working head.

23. A programmable continuous path cam controlled input command position signal generator according to claim 22, further including means for adjusting the auxiliary function control signal producing means relative to the movable cocntinuous path position control cam to thereby allow an operator of the equipment to adjust the location of the points at which auxiliary function control signals will be produced relative to the positioning path of the working head means.

24. A programmable continuous path cam controlled input command position signal generator for an automatically operable remote control machine tool manipulator according to claim 23, wherein the command position signal generator is for use with a manipulator that is capable of movement about multiple axes and at least one movable continuous path position control cam is provided for each axis of movement together with its related cam follower means, and transducer means.

25. A programmable remote control machine tool manipulator according to claim 22 wherein a plurality of movable continuous path position control cams together with associated cam follower means and transducer means are provided for at least one axis of movement of the manipulator and further including selector switch means operatively coupled to the circuit means for combining the input command position signal with the actual relative position feedback signal and further connected to the transducer means for each one of the plurality of position control cams for a given axis of movement for selectively switching the output from a desired one of the position control cams into controlling circuit relationship with the circuit combining means.

26. A programmable continuous path cam controlled input command position signal generator according to claim 22, wherein the movable continuous path position control cam comprises a generally circular disc-shape control cam having a peripheral control surface, the generally circular disc-shape control cam being rotatable to provide continuous path position control with the cam follower means engaging and riding upon the peripheral control surface.

27. A programmable continuous path cam controlled input command position signal generator according to claim 25, wherein the auxiliary function control signal producing means comprises a generally circular rotatable auxiliary function control disc synchronously rotatable with said generally circular rotatable disc-shape continuous path position control cam and auxiliary function control signal generator means controlled by said rotatable auxiliary function control disc for deriving auxiliary function control signals usable at particular points in the relative positioning of the working head means of a remote control manipulator for initiating and controlling operations performed on a work piece.

28. A programmable continuous path cam controlled input command position signal generator according to claim 27 wherein the rotary auxiliary function control disc includes means for adjusting the radial location of the points on the periphery of the rotary auxiliary function control disc at which auxiliary function control signals will be generated by the auxiliary function control signal generator means.

29. A programmable continuous path cam controlled input command signal generator according to claim 28 further including a common rotatable cam drive shaft for supporting and synchronously rotating said rotatable continuous path position control cam and said rotatable auxiliary control function disc and cam drive motor means for rotating said common cam drive shaft, said cam drive motor means comprising a reversable variable speed cam drive motor controlled by a reversible variable speed drive motor controller.

30. A programmable continuous path cam controlled input command signal generator according to claim 29 wherein the command signal generator is for use with a manipulator that is capable of movement about multiple axes and at least one movable continuous path position control cam is provided for each axis of movement together with its related cam follower means and transducer means.

31. A programmable remote control machine tool manipulator according to claim 30 wherein a plurality of rotary continuous path position control cams together with associated cam follower means and transducer means are provided for at least one axis of movement of the manipulator together with a respective associated auxiliary function control signal producing means for each position control cam provided for a given axis of movement, and further including position control selector switch means operatively coupled to the circuit means for combining the input command position signal with the actual relative position feedback signal and to the transducer means for each one of the plurality of rotary position control cams for a given axis of movement for selectively switching the output from a desired one of the position control cams into controlling circuit relationship with the circuit combining means, and auxiliary function control selector switch means operable in conjunction with said position control selector switch means for selectively switching a desired one of the auxiliary function control signal producing means into operative controlling relationship with the working head of the manipulator.

32. A method of operation for programmable automatically operable remote control machine tool manipulators having continuous path control and which include working head means, electrically controlled power drive means for relatively physically moving the working head means into desired relative work positions with respect to a workpiece, position feedback servo means for sensing the actual relative positioning of the working head means and deriving feedback electrical signals representative thereof, programmable automatic input command position signal producing means for automatically supplying an electrical input command position signal representative of the desired relative positioning of the working head means, and servo amplifier means for combining the input command position signal with the actual relative position feedback signal and deriving electrical output error control signals for controlling operation of said electrically controlled power drive means, the programmable automatic input command position signal producing means comprising an improved low cost, continuous path programmable cam controlled automatically operable input command position signal generator including at least one rotatable continuous path position control cam having peripheral control surfaces formed thereon which comprise a scaled down analogue representation of the transfer function that defines the desired command relative positioning of the working head means with the peripheral control surfaces of said position control cam having a different physical configuration from the command relative positioning path which they represent, the method comprising rotating the continuous path position control cam at a predetermined speed related to the desired speed of movement for the machine tool manipulator, reading out the control surface configurations formed on the surface of the position control cam with sensing means designed to convert the control surface configurations into corresponding electrical position control signals that comprise an electrical analogue of the relative positioning path of the working head of the manipulator, and supplying the electrical position control signals thus derived to the servo amplifier means as the input command position signal.

33. The method according to claim 32, further including generating auxiliary function control signals synchronously with the rotation of said rotatable continuous path position control cam, the auxiliary function control signals being usable at particular points in the relative positioning of the working head means for initiating and controlling various operations performed on the work piece by the working head.

34. The method according to claim 33 further including adjusting the auxiliary function control signal generation relative to the rotation of the rotatable continuous path position control cam to thereby adjust the location of the points in the relative positioning path of the manipulator working head means at which auxiliary function control signals are produced.

35. The method according to claim 34 further comprising providing a plurality of different continuous path position control cams for at least one axis of movement of the machine tool manipulator and further providing associated auxiliary function control signal generators for each such different position control cam; selectively connecting a desired one of the plurality of different position control cams for one axis of movement into path controlling relationship with respect to the machine tool manipulator, and further selectively connecting the respective associated auxiliary function control signal generator for the selected position control cam into controlling relationship with regard to the generation of auxiliary function control signals.

36. The method according to claim 32 further comprising providing a plurality of different continuous path position control cams for at least one axis of movement of the machine tool manipulator and selectively connecting a desired one of the plurality of position control cams for one axis of movement into path controlling relationship with respect to the servo amplifier means of the machine tool manipulator.

* * * * *